May 4, 1965   C. K. DANIELS   3,182,312
VEHICLE DETECTION AND COUNTING SYSTEM
Filed Jan. 11, 1962                                        2 Sheets-Sheet 1
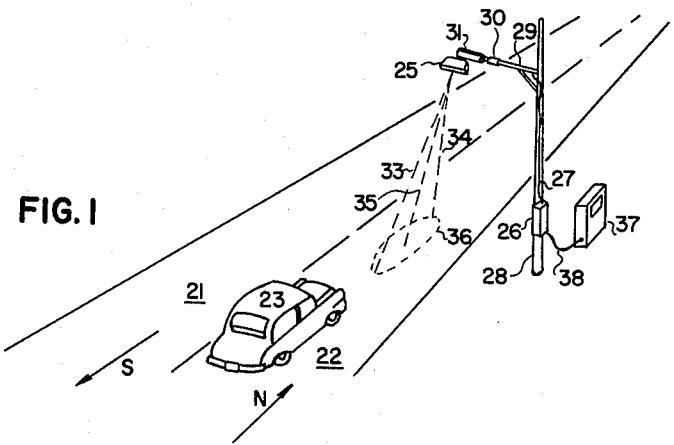
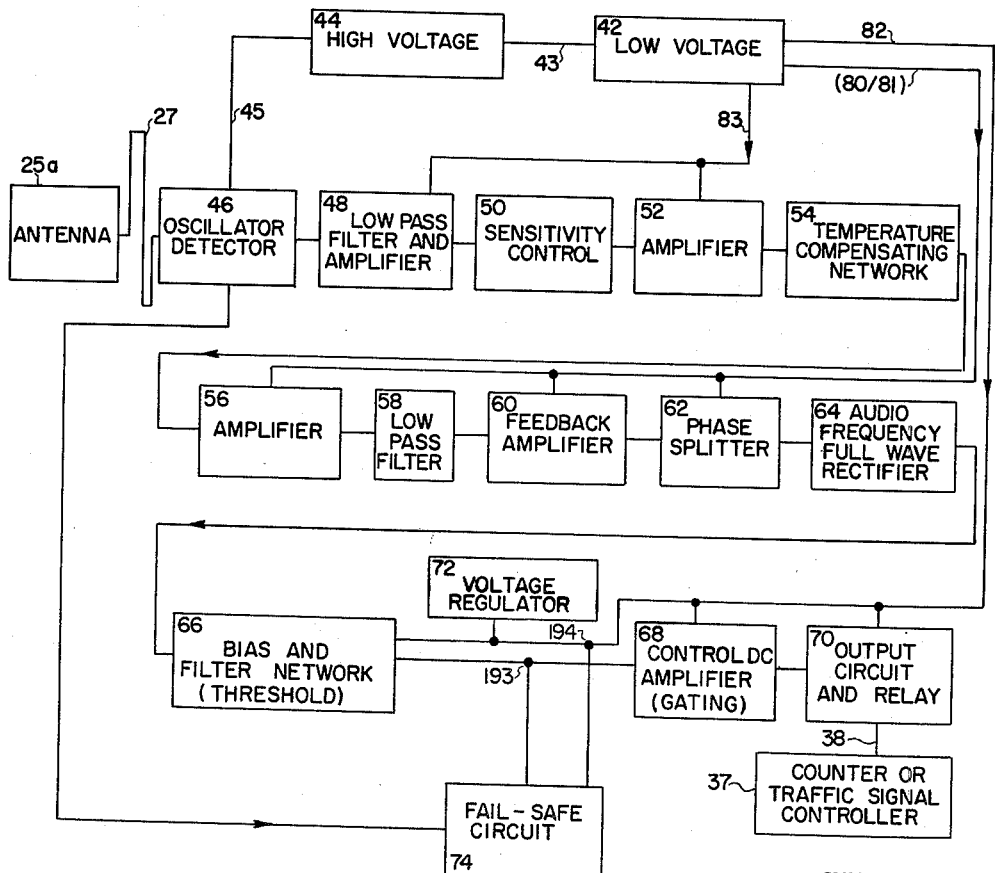
INVENTOR.
CHARLES K. DANIELS
BY
Edward H. Eames
ATTORNEY May 4, 1965

C. K. DANIELS 3,182,312

VEHICLE DETECTION AND COUNTING SYSTEM

Filed Jan. 11, 1962

INVENTOR.
CHARLES K. DANIELS

BY Edward H. Eames

ATTORNEY 3,182,312
VEHICLE DETECTION AND COUNTING SYSTEM
Charles K. Daniels, Westport, Conn., assignor to Laboratory for Electronics, Inc., Boston, Mass., a corporation of Delaware
Filed Jan. 11, 1962, Ser. No. 165,643
15 Claims. (Cl. 343—7)

This invention relates to a system or device for detecting moving bodies through comparison between transmitted micro-waves and such wave reflected or re-radiated from such bodies and in which the detection device includes substantially all semi-conductor components.

More particularly the present invention relates to an improved detection device which uses substantially all semi-conductor or solid state components and employs generation and transmission of micro-wave energy, and reception and detection of the transmitted wave energies reflected or re-radiated from an external moving body, as for example a motor vehicle proceeding along a pathway, when the reflected wave energies differ in frequency from the transmitted wave energies through the Doppler effect, as caused by the motion of the moving body.

In further aspects the invention relates to a system for counting vehicles or other objects passing a desired detection point or to a traffic signal control system employing such detection device.

Some ultra high frequency radio wave energy detector devices, which are classified as micro-wave energy vehicle detector devices, are in general use today, such as that taught by John L. Barker in his U.S. Patent 2,965,893, issued December 20, 1960, under the title "Vehicle Detector." The said Barker patent is an electronic tube device which responds to passage of a moving body through a beam of micro-wave energy, or radio energy, projected from a transmitter of the device, by sensing the difference in frequency between transmitted micro-wave energy and reflected wave energy, Doppler shifted in frequency by the moving body passing through the projected beam.

Although the vehicle detector of the Barker Patent 2,965,893 serves quite well for a wide range of conditions in traffic control systems and to some extent in traffic counting systems, it is found that where a high degree of accuracy in counting individual vehicles is needed over a wide range of speeds, including low speeds and closely spaced vehicles as well as very high speeds, higher than ordinarily prevail at traffic signals but as frequently found on super highways or some other unsignalized roads, an improved detection system is needed, and the present improved vehicle detection and counting system serves to fill this need.

Also for counting systems on super highways the heavy traffic volumes, high speeds and remote or relatively inaccessible counting or detection stations demand a high degree of relability in unattended operation despite widely varying condition of temperature, humidity, wind and weather conditions in general as well as mechanical vibration and the like in handling and in use on roads bearing heavy truck traffic for example.

Further, use of electronic tube devices has proven that long periods of use of electronic tubes tend to cause the tubes to change their operating characteristics and to fail, necessitating replacement of one or more of the electronic tubes. Such electronic tube devices require periodic or frequent maintenance and include the expense of replacement of electronic tubes which have changed their operating characteristics so as to impair operation of the detection device or have burned out or failed and caused failure of operation of such electronic device.

The need for a high degree of reliability and long life is also important in traffic signal control systems where traffic safety is a primary factor, and although traffic detectors and systems having thermionic tube circuits have served admirably in most respects their generation of heat and relatively short tube life under continuous duty and particularly in hot weather or climate has emphasized the need for improved circuitry, such as provided by the transistorized circuitry of the present invention.

The greatly improved traffic detection, counting or control system of the present invention provides output pulses suitable for operating control devices but particularly suitable for operating traffic counters to obtain individual counts of successive vehicles over a wide range of quite low to very high speeds and employs an improved temperature compensated transistorized circuit of high reliability and long life. In its preferred form the present detection system includes also a self-protective feature in automatic indication of reduction of output from the micro-wave transmitting tube sufficient to prevent normal detection of individual vehicles. A continuous output indication is provided in place of the usual intermittent pulse indications from vehicles. This serves as a fail-safe feature in providing continuous actuation of the control device or signal controller in traffic control use.

The present invention provides a greatly improved micro-wave comparison detector device which is designed primarily to serve in traffic counting applications where individual detection of individual vehicles in the traffic flow is desired and particularly, individual response to each vehicle where there is a succession of very closely spaced vehicles traveling along the same lane, over a wide range of speeds. It should be noted, however, that the present improved detector device is not limited to such application as described above since the present improved detector may be employed as a vehicle detector in a traffic control system, for example.

The physical improvements in the present invention include replacement of all the electronic tubes, except the oscillator tube, with transistors and redesigning of the associated circuitry. Further improvements include new temperature compensation circuitry which automatically adjusts signal strength between stages of amplification so as to stabilize the relation between the input signal and the output signal of the amplifier stages; new transistorized response circuitry which responds quickly and positively to signals of very short duration; inclusion of a fail-safe circuit to give indication when the power output of the oscillator tube has decreased to and below a predetermined value, and other improvements in the nature of additional components and changes in certain components so as to provide more convenient control over the internal operation of the detector circuit.

Separation of the components of the circuitry equal to at least two packages provides a detector device with a remotely locatable antenna which may be located in an overhead position over a roadway, for example, with the remainder of the circuitry located in a separate package at some accessible point, removed from the overhead position so that adjustment and/or repairs on the circuitry may be made easily, quickly and conveniently without removal of the antenna and without the necessity of interrupting traffic.

The circuitry of the improved detector device is designed with fine definition of a sharply separated small band of frequencies below sub-audio range to which the device is responsive. Multiple stages of filtering and amplification sharply define, select and amplify the frequencies to which the detector device is responsive so as to sharply and clearly indicate detection of individual vehicles in the traffic flow, passing through the confined directed beam of microwave energy. Rapid and clearly defined detection, in the form of a pulse, which may be used to supply pulses to a counter, for example, is provided for each individual vehicle passing through the directed beam of projected microwave energy over a wide range of speeds from 10 miles an hour to 125 miles per hour, for example.

In order to avoid the constant maintenance and repair generally necessary of an electronic tube device, the present invention discloses an improved form of microwave energy comparison device used for detecting moving bodies, which except for the oscillating tube, includes substantially all semi-conductor or solid state components, which are practically indestructible under ordinary use. This type of construction provides a detector device which requires less maintenance and less replacement of parts due to failure of electrical components through long ordinary use.

The versatility of the present greatly improved microwave comparison detector device is also expressed when this improved detector device is employed for detecting vehicle traffic in a traffic control system.

In addition to the improved features pointed out above, the present improved detector device provides detection of vehicles for traffic control purposes over a wider range of speeds than heretofore provided by detector devices. Detection of vehicles traveling at speeds of from 2 miles per hour to 125 miles per hour is accomplished by the present greatly improved detector device for traffic control system purposes.

With a transmitted frequency of 2455 megacycles, such as may be employed in the preferred form of the present invention, for example, a Doppler shift of 7.31 cycles per second per each mile per hour in a reflected signal is provided by a moving body when such body is moving, with respect to the transmitter/receiver, and is at a 180° straight line angle approaching or departing the transmitter/receiver. If however, a beam of micro-wave energy is directed across the path of a moving body from a position above, from the side, or from below the moving body, and directed either toward or away from the oncoming moving body at an angle to the line of travel, then a cosine effect is introduced upon the Doppler shifted frequency, decreasing to zero when the moving body is at an angle of 90° or directly under, alongside or over the transmitter/receiver. This cosine effect reduces the frequency of the Doppler shift signal of the reflected wave from a moving vehicle so as to reduce the Doppler shift frequency from a frequency which varies 7.31 cycles per second for each mile per hour of speed to substantially zero Doppler shift according to the cosine effect on the reflected signal.

The cosine effect further shifts the detection point in the zone of detection of that particular moving body, depending upon the speed of the vehicle detected, to a position closer to the vertical between the line of travel and the transmitter/receiver as the speed of travel of the moving body through the zone of detection increases. Thus it will be seen that in a system detecting motor vehicles on a roadway, the faster the vehicle is traveling through the zone of detection, the closer to the perpendicular the detection point in some zone of detection will be when the vehicle is detected.

Since it is desirous to detect all vehicles, over wide ranges of speed, it is preferred that the frequency to which the detection device will be sensitive shall be in the low sub-audio frequency range of the order of from 12 cycles per second to 16 cycles per second, for example. This low sub-audio detection frequency range provides for detection of very slow moving vehicles at a transmitted frequency of 2455 megacycles.

The preferred form of the present improved detector device is adapted to respond to a signal on the order of 14 cycles per second.

It has been found that vehicles passing through the projected beam of the transmitter at speeds of from 2 miles per hour to and including 125 miles per hour are detected by the improved detection device with the very slow moving vehicle being detected when the vehicle first enters the zone of detection and with the fast moving vehicle detected at a position which is almost directly under the transmitter/receiver when the transmitter/receiver is mounted above the roadway and is directing a beam of microwave energy downward toward the roadbed and angled toward the oncoming vehicles.

If the transmitter/receiver were mounted above the roadway and were positioned so as to direct a beam of micro-wave energy toward the roadway but away from approaching vehicles then the slow moving vehicle would be detected at a position just as the vehicle was about to exit from the zone of detection at the far end of the zone of detection while the fast moving vehicle would be detected at a position almost directly under the transmitter/receiver as it first enters into the zone of detection.

It is a principal object of the present invention to provide an improved micro-wave comparison device for detection of moving bodies using substantially all semi-conductor components.

Another object is to provide a micro-wave comparison device used for detection of moving bodies that gives separate indication for each individual moving body passing through a detection point so that the detection impulse may be used for counting purposes.

Another object is to provide an improved micro-wave comparison device, which has its circuitry separated into at least two packages so as to provide easy access for repair when necessary.

Another object is to provide a transistorized microwave energy comparison device in which is included in the circuit a thermistor temperature compensating network which automatically adjusts signal strength, according to temperature, so as to stabilize the relation between the input signal and the output signal of the amplifier stages.

Another object is to provide a substantially all solid state component microwave energy comparison device in which is included in the circuitry new transitsorized response circuitry, including a transistorized phase splitter and semi-conductor rectifiers, providing an output indicative of vehicle detection, quickly and positively in response to very short signals.

Another object is to provide a fail-safe circuit of the improved microwave energy comparison device without affecting normal operation of the device, for indicating by a continuous response output when the power output of the oscillator tube becomes reduced to and below a predetermined value.

Another object is to provide an improved detector device in which substantially all components are long life electrical components that will maintain substantially instant, operating characteristics for life, under normal use.

Another object is to provide an improved detector device which requires substantially very little maintenance over long periods of time under normal use.

Another object is to provide an improved detector device which will operate efficiently with little or no maintenance under widely varying climatic conditions.

Another object is to provide a vehicle detector device including substantially all semi-conductor components which will operate with very low generating of heat so that such detector device may be used more efficiently and reliably and for longer life periods than prior such detector devices in climates which are subject to very high temperatures.

Other objects will become apparent from a reading of the specification and the accompanying drawings in which:

FIG. 1 illustrates a traffic vehicle counting system or traffic control system located adjacent a roadway employing the present improved, micro-wave comparison detector device for detecting moving vehicles in the traffic flow;

FIG. 2 represents a block diagram of a preferred form of the micro-wave comparison detector device with each block labeled according to its function;

FIG. 1 illustrates one method of arranging and mounting the present improved detector device in an over-the-road installation.

Figure 3:
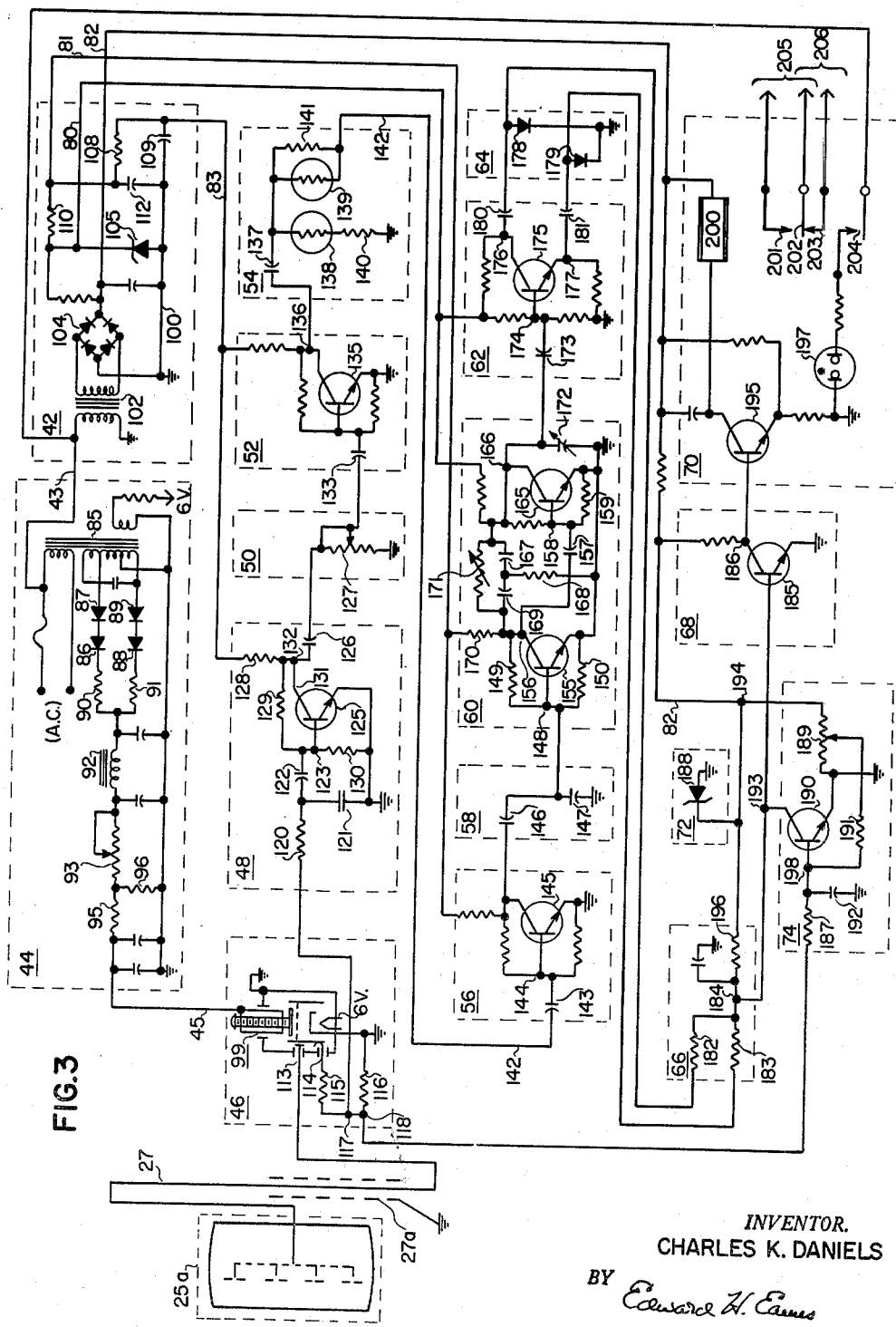
FIG. 3 illustrates in circuit diagram form a preferred form of the micro-wave comparison detector device.

It should be understood that although FIG. 1 illustrates a vehicle counting or vehicle actuated control installation in which the antenna is directing a confined beam of microwave energy downward toward the roadway and angled toward oncoming or approaching traffic, the antenna may be adjusted to direct the confined beam of micro-wave energy downward toward the roadway and angled away from approaching traffic. This alternate arrangement will provide substantially similar results as described below, relative to detection of moving vehicles with the installation as illustrated in FIG. 1.

A two-lane roadway 21/22 is illustrated serving two-way vehicle traffic, the directions of travel being represented by the arrows S and N.

A motor vehicle 23 is illustrated in lane 22 and represents various types of motor vehicles which may travel on the roadway.

The present improved detection apparatus is illustrated as installed in two separate sections, the antenna housing 25 and the circuit (except antenna) housing 26. The components in the two housings are connected electrically by a low-loss coaxial cable which is represented by line 27 extending from the housing 26, up the pole 28, through the interior of the suspension arm 29 and to the antenna mounted in the antenna housing 25. That part of the coaxial cable 27 which extends through the interior of the suspension arm and into the interior of the antenna housing 25 is not shown, however, such construction will be familiar to those skilled in the art.

It will be noted that the supporting arm of suspension arm 29 includes a larger section 30, which represents a reducing collar and an elbow assembly 31 which may include a removable plate for providing access to the interior of the assembly 31, the collar 30 and the arm 29 so that the low-loss coaxial cable 27 may be conveniently installed and connected so as to complete the installation and connection between the antenna in housing 25 and the remainder of the circuit in housing 26.

Other methods of installation and other methods of suspension of such housings, familiar to those skilled in the art may be used, if desired.

The broken lines 33 and 34 extending from the antenna housing toward the roadway, represent the half-power points of the antenna beam with the broken line 35 representing the full power point and the center of the projected micro-wave energy beam.

It has been found that, with the antenna adjusted so as to project a confined beam of micro-wave energy at an angle of approximately 15° off a vertical dropped from the center of the antenna and with half power points of approximately 15°, from the center of the beam, a beam pattern, such as represented by the broken oval 36, may be obtained on the roadway. The antenna may be suspended at a height of from 14 to 20 feet over the roadway, as desired. It should be noted that although the above figures of angle and installation have been suggested, other angular positions, relative to the vertical and other half power units may be used, as desired, according to the needs of the installations.

It has also been found that a low-loss coaxial cable of some 100 feet in length may be used to connect the antenna in the antenna housing and the remainder of the circuit in the circuit housing so that the circuit housing 26 may be removed to a position more remote than that indicated in FIG. 1, if desired.

A box 37 is illustrated as being connected to the circuit housing 26 via lead 38. The box 37 may represent a counting device which accumulates the pulses received from the output of the circuit housing 26 and may indicate the number of pulses or count in the window indicated.

The counter may be of the electro-magnetic or electronic type or may be of the computer type or any other type generally used to count motor vehicle or other moving bodies.

The box 37 may also represent a signal controller or signal switch may may respond to the detection pulse output of the circuit housing to operate a signal (not shown) for control of vehicle traffic on the roadway 21/22.

Referring to FIG. 2, a block diagram of the present improved substantially all semi-conductor component, micro-wave comparison detector device is presented, with each block labeled so as to generally indicate its function and each block numbered with the numbers corresponding to similarly numbered sections in the circuit diagram in FIG. 3.

Block 42 represents a low voltage power supply from which is obtained a direct current (D.C.) voltage supply of approximately +10 volts and a supply of between +15 and +20 volts D.C.

Block 44 represents a high voltage power supply from which is obtained a D.C. of some +210 volts which is referred to below as the B+ supply serving as the plate voltage for the electronic oscillator tube via lead 45. For convenience a low voltage alternating current (A.C.) heater voltage of some 6 volts A.C. is also provided from block 44 for the ultra high frequency oscillator tube in block 46, the oscillator/detector.

Block 25a represents the antenna which, in FIG. 1, is represented to be housed in the antenna housing 25 and the line 27 represents the low-loss coaxial lead which connects the antenna 25a and the oscillator/detector 46.

Block 48 represents a low pass filter for the signal which is picked-off the oscillator/detector, as more fully described below, and one stage of transistorized amplification, with block 50 representing a sensitivity control which may be adjusted, as desired so as to provide a larger or smaller detection zone. Adjustment of the sensitivity control may extend the zone of detection somewhat beyond the half power points or may reduce the zone of detection inside the half power points of the beam, indicated as desired.

Block 52 represents another (second) stage of transistorized amplification with block 54 representing a temperature compensating network which employs thermistors which, according to the ambient temperature, compensate for changes in characteristics of the semi-conductor components caused by changes in such temperature.

Block 56 represents a third stage of amplification with block 58 representing another low pass filter.

Block 60 represents a fully transistorized selective feedback amplifier circuit with regenerative characteristics in a desired low audio frequency band. As more fully described below a variable resistance, which is adjustably variable within limits, may be adjusted to provide a very narrow, sharp peaked band-pass or a somewhat wider band-pass which may be relatively less sharply peaked, as desired, according to the use of the detector device and the accuracy in count required.

Block 62 represents a phase splitter which provides, in cooperation with block 64, for positive detection of very fast moving vehicles which may pass through the projected beam and provide a reflected signal in the sensitive frequency range which is substantially shorter in time than the time of one cycle of the sensitive or detection frequency, regardless of the phase of the Doppler beat frequency, that is, whether the signal is part of a positive going wave or part of a negative going wave.

Block 64 represents an audio frequency full-wave rectifier which provides a pulsating D.C. signal and applies the signal to block 66, the bias and filter network. The pulsating D.C. signal is filtered and is applied to the bias circuit so that a normally forward bias may be overcome and made a reverse bias, if the D.C. signal is of sufficient value. Block 66 may also be referred to as a threshold bias circuit.

Block 68 represents a control D.C. amplifier or threshold D. C. amplifier which serves as a gating or trigger circuit for the output circuit and output relay, represented by block 70. Block 72 represents a voltage regulator which provides a stable D.C. voltage for the bias and filter network, block 66 and the control D.C. amplifier, block 68.

Block 74 connects between the control D.C. amplifier block 68 and the oscillator/detector, block 46 and represents a fail-safe circuit. This fail-safe circuit which may, if desired, be eliminated from the improved detector device, by disconnecting block 74 from the circuit at junctions 193 and 194, provides a constant indication when the grid voltage of oscillator tube 99 becomes reduced by an adjustably predetermined amount. Such reduction of the grid voltage of the oscillator tube may be caused by reduction of the output power of the tube. Reduction in output power may result from increased age of the oscillator tube or failure of the oscillator tube for any reason. Failure of other circuit components may also cause a reduction in the grid voltage of the oscillator tube.

Block 70 includes an output relay which becomes energized and "pulls-in" for example to indicate detection of a moving body. Such pull-in may, as illustrated in FIG. 3, cause closure or opening of one or more sets of contacts may provide a detection pulse through completion or opening of a prepared circuit.

Block 37 represents a counter or traffic signal controller which may be connected to and receive the output pulses of the output circuit and relay, block 70 via the lead 38.

Referring to FIG. 3, a circuit diagram of the substantially all solid-state detector device is illustrated in its preferred form. The circuit diagram of FIG. 3 is separated into sections by broken lines and each section is numbered. Each section of FIG. 3 illustrates circuitry that is represented in FIG. 2 in block form, and numbered with a similar number.

Generally, an ultra-high frequency of some 2455 megacycles, for example, is generated in the oscillator detector and is transmitted in a directed beam by the antenna. Received signals are channeled to the oscillator detector where any difference between the transmitted and received signals is detected as a difference frequency.

A received signal that has been reflected from a moving body that is moving toward or away from the antenna may be assumed to have been shifted in frequency, according to the Doppler effect and the Doppler shift frequency will appear as the difference frequency in the oscillator detector. As previously mentioned a Dippler shift of 7.31 cycles per second per mile per hour is provided by a moving body on a transmitted frequency of 2455 megacycles. Thus a Doppler shift of lower frequency in the audio and sub-audio range may be provided by vehicles traveling through the angularly directed beam and causing reflections of the transmitted signal, Doppler shifted in frequency, to the antenna of the detection device.

Any Doppler signal, or difference frequency is applied to a low-pass filter network which substantially attenuates frequencies, above the low audio and sub-audio range and passes on the Doppler signal to additional amplifying stages. The Doppler signal is then applied to another low pass filter and to selective feedback amplifier which, in the preferred form, is peaked at 14 cycles per second and provides maximum regenerative feedback at the peak frequency with maximum amplification at such peak frequency.

In the present circuit the amplification characteristics of the selective feedback amplifier circuit may be varied according to the setting of a variable resistance associated with the selective feedback amplifier circuit.

The amplified Doppler signal is applied from the feedback amplifier to a phase splitter and an associated audio frequency full wave rectifier. The rectified signal is applied to a bias and filter network which filters the rectified signal. The filtered signal from the rectifier affects the bias, which bias controls the control D.C. amplifier. The effect of the filtered signal is to vary the bias on the control D.C. amplifier so as to reverse the condition of the control D.C. amplifier.

With the condition of the control D.C. amplifier reversed the output circuit becomes conductive.

The circuit diagram of the present improved, substantially all solid-state micro-wave comparison detector device illustrates circuitry and components, in section 44, through which a substantially constant high voltage of approximately +210 volts D.C. may be provided from a 60 cycle alternating (A.C.) when using a regulated transformer. This method of obtaining the direct current operating voltages is shown as one example of how such operating voltages may be obtained, if desired. When operating direct current power is available, rectification of an A.C. is unnecessary.

As illustrated in section 44, the A.C. power is applied to the primary coil of regulated transformer 85 and induced A.C. is applied to the diodes 86, 87, 88 and 89 which diodes rectify the A.C. into a D.C. and apply the D.C. through associated resistors 90 and 91. This D.C. is applied to a choke coil 92 and a potentiometer 93, resistors 95 and 96 and to several capacitors, all of which are arranged to filter the rectified power into a smooth D.C. to serve as the B+ supply for the plate of oscillator tube, 99 via lead 45.

A somewhat lower A.C. of 6 volts, for example, is also obtained from this section, to provide heater voltage (6 v.) for the oscillator tube 99. The complete heater circuit for the oscillator tube has been omitted for convenience.

In the section 42, a somewhat lower D.C. is provided from the A.C. supply. The circuitry in block 42 illustrates one method by which the relatively low D.C. supply may be provided, however other methods of providing D.C. power of substantially the same value may be used, if desired.

A.C. is applied to transformer 102 via lead 43. A D.C. of from +15 to +20 volts is provided through the bridge connected diodes 104 and applied via lead 82 to sections 66, 68, 70, 72 and 74, while a lower D.C. of some +15 volts, for example, is provided through use of a Zener diode 105, feeding into lead 80 and thence to sections 60 and 62. The lead 100 represents the common ground return which may be a chassis ground or a return lead. Lead 81 provides a D.C. of some +10 volts to sections 56 and 60.

The low D.C. supply provided by section 42 is used as operating voltage for the transistors and other solid state components which may operate at a lower voltage than the B+ supply used for the plate supply of the electronic oscillator tube.

Resistor 108 and capacitor 109 are connected to decouple the amplifying stages in blocks 48 and 52 so as to prevent signals from subsequent stages of amplification from being fed-back through the power supply in such a manner as to cause unwanted oscillations.

Resistor 110 and capacitor 112 perform a similar function and are associated with the amplifier stages in block 56 and the following stage of amplification in block 60.

The antenna, in section 25a is used for transmitting the ultra-high frequency radio energy generated in the oscillator detector section 46 and for receiving the reflected signal.

The generated signal is picked out of the cavity of the oscillator tube by means of capacitor type probe, 113 and channeled to the antenna by means of the low-loss coaxial cable 27. The broken lines 27a, which are grounded indicates that the coaxial shield of lead 27 is grounded.

The received signal is also channeled by coaxial cable 27 to the cavity of the oscillator detector where the received signal is mixed with the generated signal and a beat frequency is developed when there is a changing difference between the generated signal and the reflected received signal.

A difference in frequency between the generated transmitted frequency and the reflected received frequency, is detected in the cavity. The difference between the two frequencies is referred to as a difference frequency or beat frequency and appears as a change in potential in grid current, which change is at a frequency corresponding to the difference frequency, sensed at grid 114. The difference frequency substantially corresponds to the Doppler shift and may also be referred to as the Doppler signal.

The difference frequency or Doppler signal appears across the potential divider including resistors 115 and 116 to ground 100 in the grid self-bias circuit. At junction 117, between the last named resistors, the Doppler signal is picked off the grid circuit and is applied to a low pass filter including resistor 120 and capacitor 121 connected to ground. Resistor 120 also serves to prevent the oscillator 99 from being overloaded.

The filtered Doppler signal is applied through coupling capacitor 122 to the base 123 of a transistor 125 in section 48 which amplifies the filtered Doppler signal and applies the amplified signal through coupling capacitor 126 to a variable resistor 127 in section 50, which serves as a sensitivity control.

Normal operating D.C. voltages, without the Doppler signal, are applied by means of a potential divider including resistors 128, 129 and 130, to the base 123 of transistor 125 and to the collector 131. Such D.C. voltage causes conduction of transistor 125 but the voltage at 132 is a D.C. voltage and is blocked by capacitor 126. With a Doppler signal at junction 117 applied through the filter 120/121 and coupling 122 to the base 123 in addition to the normal operating voltages at such point, an amplified signal appears at junction 132 which is of the same frequency as the Doppler signal appearing at junction 117. The amplified A.C. signal is applied from 132 through the coupling capacitor 126 to the variable resistor 127 and through coupling capacitor 133 to the operating bias circuit of transistor 135 in section 52 for additional amplification in a manner similar to that described for transistor 125.

The amplified signal of transistor 135 from junction 136 is applied through a coupling capacitor 137 to the thermistors 138 and 139 in section 54 which compensates for changes in temperatures.

The thermistors 138 and 139 are provided to stabilize the amplitude of the amplified signal.

Variations in temperature are known to have adverse affects on the operating characteristics of transistors and other semi-conductor components. In order to stabilize the amplitude of the amplified signal over a wide range of temperatures which may vary from normal room temperature to temperatures both above and below normal room temperature, thermistor 138 and resistor 140 are connected in series between the coupling capacitor 137 and the common ground return and thermistor 138 and resistor 141 are connected in parallel between the capacitor 137 and the input line 142 to the amplifier in block 56.

The series connected combination of thermistor 138 and resistor 140 provides for passage of additional signal from capacitor 137 to the amplifier stage in block 56 throughout the temperature range of from about −30° Fahrenheit (F.) to normal room temperature with the signal passed increasing in amplitude as the difference in temperature increases from normal room temperature.

As the temperature of the materials of the components of the amplifier stages decreases below normal room temperatures the combined gain of the amplifier stages decreases. Accordingly as the temperature decreases the value of resistance across thermistor 138 increases from a value substantially below the value of resistance of the resistor 140 to a value exceeding the resistance of resistor 140. The signal passed from capacitor 137 to the amplifier is increased in amplitude as the resistance to ground increases. Such increase in amplitude of the signal passed to the amplifier is at a rate which is proportional to the difference between normal room temperature (about 68° F.) and the actual temperature of the materials of the components which may be lower than normal room temperature, down to about −30° F. when the maximum permitted signal is passed.

As the temperature of the materials of the components of the amplifier stages increases above normal room temperature, the gain of the amplifier stages decreases. Accordingly as the temperature increases the value of resistance across thermistor 139 decreases from a value of resistance substantially equal to the resistance of resistor 141 to a value of resistance substantially less than the resistance of resistor 141. Thus the signal passed from capacitor 137 to the amplifier block 56 is increased as the resistance across the thermistor 139 decreases. The increase in amplitude of the signal passed to the amplifier by the combined effect of thermistor 139 and resistance 141 is at a rate which is proportional to the temperature difference between normal room temperature and the actual temperature of the materials of the components which may be higher than normal room temperature up to about +170° F., at which temperature the maximum permitted signal is passed.

The amplified signal is passed through the temperature compensating network and is applied to a third stage of amplification via lead 142 and coupling capacitor 143. The signal is applied to base 144 of transistor 145 which amplifies the signal in a manner similar to that described for transistor 125 and passes the signal to another low pass filter, section 58. Capacitor 146 pases the amplified signal from transistor 145 to capacitor 147 of section 58 which provides a path to ground for frequencies above a desired frequency while the low, passed frequencies are applied to the base 148 of transistor 155 in section 60 for additional amplification.

Transistors 155 and 165 are part of the selective feedback amplifier with regenerative characteristics. As the Doppler signal is applied to junction 148 and thus to the base of transistor 155 conduction of the transistor varies and the voltage at junction 156 varies according to the frequency of the input signal. The signal at junction 156 is applied to the phase shift network of capacitor 157 in combination with the impedance of the base/emitter junction of transistor 165 which provides an electrical phase shift of the signal. The shifted signal is applied to junction 158 and to the base of transistor 165 which amplifies the signal which appears at junction 166 amplified and is shifted approximately 180 electrical degrees from the signal at junction 158. Part of the amplified signal at junction 166 is applied to the phase shift networks including capacitor 167 and resistor 168 to the ground return and to the phase shift network including capacitor 169 and resistor 170 to A.C. ground. The series resistors 149 and 150 are in parallel with resistor 170, as is transistor 155, relative to A.C. ground. The feedback signal is applied to junction 156 and again applied to the phase shift network including capacitor 157 and the impedance of the base/emitter junction of transistor 165 to junction 158. The value of the capacitors and resistors that make up the three phase shift networks are such that, for an A.C. signal of approximately 14 cycles per second, a combined electrical phase shift approaching 180 electrical degrees is obtained from the three phase shift networks. With the addition of the 180° phase shift of the signal through the transistor 165, the feedback signal at junction 158 is slightly out of phase with the signal applied through transistor 155 and junction 156 through the phase shift network 157 and the base/emitter junction of transistor 165 to the junction 158 so that the two signals are almost in phase with each other when the frequency is within the selected bandpass which is peaked at 14 cycles per second in the preferred form. The adjustable resistance 171, which shunts the capacitors 167 and 169 is adjustable within limits, and adjusts the amplitude of the center frequency passed by the phase shift networks so as to either increase or decrease the amplitude as the value of resistance is decreased or increased respectively. The lower limit of the adjustable resistance 171 is so selected that the resistance will not significantly shift the center frequency.

Capacitor loading by capacitor 172 electrically connected between junction 166 and ground 100, prevents oscillation of the selective feedback amplifier and selection of the phase shift components provides for a slight out-of-phase condition between the input signal at junction 158 and the feedback signal at junction 158 so as to prevent self oscillation within the selective regenerative feedback circuit itself.

Capacitor 172 also serves to dampen the ringing characteristics of the feedback amplifier circuit and is preferably adjustable, as illustrated to permit limited ringing of such feedback amplifier circuit if desired.

It may be desirable to provide limited or controlled ringing of the feedback amplifier circuit so as to cause the feedback amplifier to "ring" and thus extend any extremely short signal within the band of frequencies passed and amplified by the feedback amplifier and thus provide an output signal of larger duration through ringing.

It should be noted that the combination of capacitor 157 and the impedance of the base/emitter junction of transistor 165 provides a phase shift network. Resistor 159 is so selected so as to perform the proper bias and collector/base leakage functions and is of such value as to have only slight effect on the phase shift of the signal occurring across capacitor 157.

Since the phase shift obtained by the combination of capacitor 157 and the base/emitter junction of transistor 165 is substantially less than 60°, then the phase shift characteristics of the phase shift networks of 167/168 and 169/170 and the parallel circuitry, may each closely approach 60° at the center frequency so that the total phase shift, including the phase shift across transistor 165, from junction 158 back to junction 158 around the feedback circuit approaches 360° so that the feedback signal is almost in phase with the input signal at junction 158.

Thus for frequencies within the selected bandpass, which is peaked at 14 cycles per second in the preferred form, maximum amplification of the Doppler signal is obtained at junction 166. Coupling via capacitor 173 is provided to apply the amplified A.C. signal to junction 174 and to the base of transistor 175 in section 62 which serves as a phase splitter. Diodes 178 and 179 in section 64 serve as an audio frequency full wave rectifier so that when a Doppler signal is applied to junction 174 the signal at junction 176 and junction 177 will be applied through their respective capacitors 180 and 181 to the respective diodes 178 and 179. When the A.C. Doppler signal is negative at junction 176 the A.C. Doppler signal will be positive at junction 177 and diode 178 will pass the negative signal and diode 179 will block the positive signal so as to provide a negative signal through resistor 182 and junction 184 in section 66. The negative signal applied through resistor 182 reduces the normally positive potential at junction 184 so that the potential becomes less positive. When the A.C. signal at junction 176 is positive the A.C. signal at junction 177 will be negative and diode 179 will pass the negative signal and diode 178 will block the positive signal providing application of the negative signal across resistor 183 and applying a negative signal at junction 184, thereby reducing the normally positive potential at 184 to a less positive potential. Thus a rectified Doppler signal will appear at juntcion 184 as a D.C. positive with respect to ground but less positive than the normal positive signal at junction 184.

Normally the positive potential at junction 184 is sufficiently positive to forward bias transistor 185 in block 68 and maintain transistors 185 conducting. A negative signal, such as may be provided by the full wave rectifier 64, may sufficiently reduce the positive potential so that the forward bias may be overcome and become reverse bias which will cause transistor 185 to become non-conducting. The forward bias may be referred to as a threshold bias since the negative signal must be at least of a certain predetermined value to overcome the forward bias of transistor 185 and convert this bias into reverse bias.

It should be noted that the negative signal applied from the full wave rectifier to junction 184 is a pulsating D.C. This pulsating D.C. is filtered by the action of resistor 196 and the capacitor in block 66 which form a filter network. The less positive signal at junction 184 is proportional in amplitude to the amplitude of the Doppler signal at the peak frequency and is sufficiently close to ground to cause normally forward biased conducting transistor 185 to become non-conducting through reverse bias.

It should be pointed out that if the Doppler signal is so short so as to be shorter in time than the time of one cycle of the signal and the capacitor 172 has been adjusted so as to prevent ringing of the feedback amplifier circuit, action of the phase splitter and the full wave audio rectifier will provide detection via such short signal whether the short Doppler signal is a positive going signal or a negative going signal, since the D.C. signal applied to junction 184 from the full wave audio rectifier is a pulsing D.C. signal which compares with the Doppler beat frequency signal. Full wave rectification of the Doppler signal may provide a D.C. signal at junction 184 from the full wave rectifier to reduce the normal positive potential at junction 184 even though the Doppler signal is extremely short thus providing detection of very fast moving vehicles which may provide the very short Doppler signal.

Further, use of a phase splitter and full wave rectifier to detect signals of very short duration eliminates the necessity of providing detection of vehicles which produce very short signals, through ringing of the selective feedback amplifier circuit. Thus the capacitor 172 may be adjusted to substantially eliminate ringing of the selective feedback amplifier. This provides for a more stable regenerative feedback circuit which is less liable to self-oscillate.

Since the signal from the full wave audio rectifier 64 is applied to the bias and filter network 66 and must overcome a predetermined potential at junction 184, the block 66 could be referred to as a threshold circuit, thus as will be seen below, the combination of block 66 and block 68 may be referred to as a threshold response circuit, or a threshold response amplifier.

The rectified Doppler signal, which is proportional in amplitude to the amplitude of the A.C. Doppler signal, is applied to junction 184 which reduces the normal potential at junction 184. Application of the less positive signal at junction 184 to the base of transistor 185 causes cut-off of the normally conducting transistor 185. As transistor 185 goes to cut-off, a positive going signal appears at junction 186. The signal appearing at junction 186 may be referred to as a trigger signal or pulse. The positive signal or trigger pulse at junction 186 is applied to the base of transistor 195 in section 70 and causes transistor 195 to conduct. Conduction of transistor 195 completes a circuit including relay 200 so that relay 200 becomes energized and pulls-in. Energization of the relay 200 may cause reversal of its contacts 201/202 and completion of an output circuit 205 which may provide an electrical pulse which may be used for counting, control or other purposes. The normal condition of transistor 195 is non-conductive and thus contacts 201/202 are normally open and contacts 202/203 are normally closed. It may be desired to open a circuit, such as 206 upon operation of relay 200.

The lead 38 in FIG. 1 and FIG. 2 may represent an output which closes a circuit upon pull-in of the relay 200, as illustrated by output circuit 205 or lead 38 may represent an output which opens a circuit upon pull-in of relay 200, as illustrated by output circuit 206.

The Zener diode 188 is provided as a voltage regulator to maintain the normal potential at junction 184 at a substantially constant positive value. The normal positive potential at 184 is normally maintained at a certain value above the cut-off level of transistor 185 so that the transistor 185 is forward biased by such positive potential and is normally maintained in a state of conduction. In order to reverse bias or cutoff transistor 185 the potential at 184 must be reduced at least a predetermined amount to at least a lower positive value with respect to ground so as to reverse the bias on the transistor 185. Thus the negative signal from the full wave audio rectifier must be of sufficient negative value to reduce the positive potential (or change the forward bias to reverse bias) at 184 to below the cutoff level of transistor 185. Thus the amplitude of the rectified signal from the full wave audio rectifier must be at least at or above a predetermined value.

When the Doppler signal is rectified by action of the phase splitter and full wave audio rectifier and the rectified D.C. signal is applied to junction 184 and is sufficient to reduce the normal positive potential at junction 184 to a less positive potential which is at or below the cut-off value of transistor 185, the reduced positive potential causes transistor 185 to sharply become non-conducting.

Closure of contact 204 causes illumination of an indicator lamp 197. The indicator lamp 197 may be remotely located if desired.

In order to insure that a rapid response to the detection signal is obtained by rapid pull-in of the relay 200 a voltage regulator including the Zener diode 188 in section 72 is provided in the control circuit for the transistor 185 is section 68, which stabilizes the operation of transistor 185.

Potentiometer 189, transistor 190, resistor 191, capacitor 192 and resistor 187 combine to provide what is referred to as a fail-safe circuit, which will provide a substantially constant indication, as against the normal pulsed indication, when the grid potential of the oscillator tube 99, decreases to and below a predetermined, preset value.

It should be observed that under normal operating conditions the grid potential bears a certain relationship to the output power of the oscillator tube so that when the oscillator tube is conducting within an allowable tolerance the grid potential will be at or in excess of a predetermined potential. By adjustment of the arm on the potentiometer 191 response, caused by the fail-safe circuit may be provided when the grid potential difference is decreased to or below the predetermined potential.

The fail-safe circuit may be disconnected from the detector device by disconnecting the components of section 74 from the remainder of the circuit at junctions 193 and 194 and at junction 118 in section 46.

Section 74, the fail-safe circuit, provides a sustained indication by causing sustained cut-off to transistor 185 and thus sustained conduction of transistor 195 thereby causing sustained pull-in of relay 200 when the power output of the oscillator tube 99 and thus the grid potention of the oscillator tube (drops to and below a predetermined level.

Normally junction 118 in section 46 is at negative potential with respect to ground. As tube 99 ages, the output power of the tube decreases and the potential at junction 118, which is the potential at junction 117, decreases toward ground zero.

The negative potential at junction 117 is applied through resistor 187 to junction 198. A positive potential with respect to ground, which is regulated by diode 188, is applied from diode 188 through junction 194 to potentiometer 189 to ground. A predetermined value positive potential is picked off by the arm of potentiometer 189 and applied through resistor 191 to junction 198.

The arm of potentiometer 189 is adjusted so as to provide a positive potential, applied to junction 198 of sufficient value so as to cause transistor 190 to become conducting when the value of the negative potential at junction 118 is at or below a predetermined minimum negative value with respect to ground.

The normal condition of transistor 190 is at cut-off, held by the normal negative potential applied to the base of transistor 190 from junction 198, which normally overcomes the positive potential applied to junction 198.

When the negative potential at junction 118, which is applied to junction 198 through resistor 187, becomes sufficiently low so as to be overcome sufficiently by the positive potential applied to junction 198, through resistor 191, transistor 190 will conduct. Upon conduction of transistor 190 the potential at junction 184 becomes less positive due to the increased voltage drop across resistor 196. The lowered potential at junction 184 is applied to the base of transistor 185 which goes to cut-off, and the potential at junction 186 goes positive and transistor 195 becomes conductive which causes pull-in of relay 200.

Conduction of transistor 190 is sustained so long as the potential at junction 118 remains at or below the predetermined value and therefore results in a sustained pull-in of the relay 200 and sustained illumination of indicator lamp 197. Sustained illumination of lamp 197 may indicate that the output power of tube 99 has been reduced to or below a minimum allowable value, necessary for proper operation of the detector device.

The resistor 187 and capacitor 192 combination serves as filter and decoupling network to provide against unwanted oscillation being applied through to junction 118 and thus junction 117 and from there being amplified. Preferably this decoupling combination is physically located close to junction 118 to guard against "hum" pick-up and other electrical noise which may be picked up in the lead between the resistor 187 and junction 118.

Although the installation illustrated in FIG. 1 includes a positioning of the antenna housing over a lane of a roadway, it may be desirable to locate the antenna housing in a position adjacent to the roadway or pathway over which a body or vehicle is moving or will move. As for example, the improved detector device may be located in a tunnel or other restricted facility where the positioning of the antenna housing adjacent to the actual pathway is convenient. This may be accomplished by mounting the antenna housing off to the side of the pathway and positioning the antenna housing so as to direct the confined beam of microwave energy across the pathway of bodies moving along the pathway and angling such beam of microwave energy either toward or away from the approaching body.

Other types of installations are anticipated herein as for example an installation in which the antenna housing is installed in or under a roadbed, as for example, under the roadbed of a bridge where the roadbed of the bridge is a metal grill or grate or other material which will permit passage of the microwave energy through to the surface and above the surface so as to permit the directing of a beam of microwave energy upward across the pathway of approaching vehicles.

In summary, a microwave energy comparison device for detecting moving bodies including substantially all solid-state electrical components, except the oscillator/detector tube, which may be of the commercially designated type 2C40 electronic tube with reentrant cavity, is provided in which the antenna/receiver is physically separated from the remainder of the circuit with electrical connection between the antenna/receiver and the remainder of the circuit by a length of low loss coaxial cable. Since there are no electrical elements in the antenna/receiver which may become defective, the antenna/receiver may be located at a place which is not conveniently accessible, as for example over a roadway, while the remainder of the circuitry is located at a conveniently accessible location as for example, at the side of the roadway.

A solid state regulated power supply which is employed to convert alternating current into a high voltage direct current of substantially constant amplitude, is provided to increase the operating life of the electronic oscillator/detector tube.

Grid circuit pickoff of any Doppler beat frequency developed in the oscillator/detector tube applies such Doppler beat frequency through stages of filtering and transistorized amplification with a temperature compensating network which, by dual thermistor control, stabilizes the relation between the Doppler beat frequency at the pickoff and the output signal of the amplifier network even though the amplification characteristics of the transistors may change due to variations in temperature.

The transistorized regenerative feedback amplifier circuit includes the addition of convenient, internal control in the form of a variable resistance which is in shunt with two of the series connected capacitors in the feedback circuit and a second control in the form of a variable capacitor in shunt to ground with the amplified signal with the variable resistance providing convenient control of the amplification of the feedback signal and the variable capacitor providing convenient control of ringing characteristic of the feedback amplifier circuit.

A transistorized phase splitter providing two common outputs and a full wave audio frequency rectifier combine to convert the amplified Doppler beat frequency signal, which is an A.C. signal, to a comparable pulsating D.C. signal which may overcome a normally forward biasing circuit for a transistorized control D.C. amplifier circuit. The combination of phase splitter and full wave rectifier provides a D.C. signal from extremely short Doppler beat frequency signals regardless of the phase of such Doppler beat frequency signal. The D.C. signal from the full wave rectifier is applied to the transistor biasing circuit and may reverse the normal forward bias so as to convert such normal forward bias to a reverse bias so as to cause triggering of the transistorized output circuit thus indicating passage of a moving body through the directed beam. Thus the combination of phase splitter and full rectifier provides for rectification of extremely short signals and for detection of vehicles producing extremely short Doppler beat frequency signals.

The preferred form of the invention has been described employing ultra-high frequency radio wave generation, transmission and reception with an ultra-high frequency of 2455 megacycles as an example frequency that may be used as part of the detection means. Obviously the ultra-high frequency radio wave energy generated and transmitted may be substantially increased in frequency, up to some 10 times or more such 2455 megacycles for example, if desired.

If, for example, the generated and transmitted ultra-high frequency radio wave energy of the detection means were increased in frequency to approximately 10 times the frequency of the example frequency, then the Doppler shift frequency produced by reflection from a moving object would be increased in frequency linearly over the Doppler shift frequency produced by the same object moving at the same speed reflecting ultra-high frequency radio waves at the example frequency.

Therefore, if a detection means, generating and transmitting a somewhat higher frequency than 2455 megacycles were to be employed in the present invention it may be necessary to increase the peak frequency of the band pass as well as to widen the band pass provided by the filter networks including the feedback amplifier, depending upon the amount of increase in frequency used.

When the cosine factor is taken into consideration as previously explained, the Doppler effect is reduced somewhat so that for a detection means generating and transmitting a frequency of, for example, 24,550 megacycles, the filter network and feedback amplifier providing a band-pass of, for example, some 50 cycles per second to 140 cycles per second, with a band pass peaked at 95 cycles per second may be found sufficiently high in frequency and sufficiently wide to provide for detection of very slow moving vehicles to very fast moving vehicles passing substantially under the antenna.

Although the preferred form of the invention has been described as employing the transmission and reception of ultra-high frequency radio wave energy, or microwave energy, for developing the Doppler beat frequency used in the present detection system, other radiant wave energy means might be employed to develop a Doppler beat frequency in a similar manner as by the transmission and reception of supersonic or ultrasonic waves in air, the latter waves being similar to sound waves above audible frequencies, for example, and considered microwaves.

Supersonic waves of frequencies of the order of 25,000 cycles per second may be directed in divergent beam form, as illustrated in FIG. 1, and the mixture of transmitted and reflected waves will provide a Doppler beat frequency of the order of 10 times that obtained with the example frequency of 2455 megacycle radio wave transmission described above, but comparable to the beat frequency obtained from radio wave transmission at 25,000 megacycles, which has comparable wave length, for example. Radio waves of the length produced by the frequencies of 2455 megacycles and above, are normally considered microwaves. Thus the electrical signal of Doppler beat frequency derived from rectification of the mixture of electrical waves corresponding to supersonic transmitted waves and electrical waves corresponding to the received reflected waves may be applied to the circuitry corresponding to a block diagram to the right of the oscillator/detector, block 46 of FIG. 2 in the same manner as that for the mixture of transmitted and reflected radio waves as described above.

A microwave comparison detector device for detecting moving vehicles and employing supersonic radiant energy detection means may be similar in many respects to the microwave energy comparison detector device employing ultra-high frequency radio energy detection means represented in block form in FIG. 2. The oscillator/detector associated with supersonic radiant energy detection means may be of the ordinary type oscillator/detector for generating an electrical frequency of the order of 25,000 cycles per second, or 25 kilocycles, while lead 27 in FIG. 2 and FIG. 3 would provide connection to an electrical acoustical transducer capable of converting the generated electrical frequency of 25 kilocycles to supersonic waves of comparable frequency and directing the supersonic waves through air in a form of a beam. Such electrical acoustical transducer would be employed in lieu of the antenna represented by block 25a in FIG. 2 and FIG. 3.

Reception of the reflected supersonic waves, Doppler shifted in frequency may be made by an acoustical electrical transducer capable of receiving supersonic waves within the general range of frequency of the projected supersonic waves which converts the received supersonic waves, now Doppler shifted in frequency, into electrical waves of comparable frequency. The electrical waves, comparable in electrical frequency to the frequency of the received supersonic waves, may be applied to the oscillator/detector in which the Doppler beat frequency is detected.

Processing the Doppler beat frequency would be similar to that described above, relative to the detection device employing radio wave detection means. This alternate method would then provide a microwave energy comparison detector device employing supersonic detection means to provide a detection pulse.

While the preferred use of this invention is in detecting motor vehicles it should be clear that the terms VEHICLE and MOVING BODY may include various types of motor vehicles, trains, aircraft, and boats. In connection with the detection of aircraft, the transmitting unit may be mounted within a runway, alongside a runway, or even off the end of the runway in the direction of approach or departure of aircraft. In either position a microwave beam may be directed upward or across the runway or in the direction of the runway, so long as the beam is directed to intercept the aircraft at some point in its path where the cosine angle factor produces a low Doppler frequency.

Thus among others, the several objects of the invention as specifically aforenoted are achieved. Although alternate forms of the invention have been pointed out above obviously numerous other changes in construction and rearrangement of parts might be resorted to without departing from the spirit of the invention within the scope of the claims.

I claim:

1. A detector of objects moving along a path including means for transmitting a beam of high frequency waves at an angle across said path to be intercepted by said objects and for receiving such waves reflected from said objects and Doppler shifted in frequency by the component in the direction of said transmitter-receiver of the motion of said object along said path and means for deriving a beat frequency signal representative of the frequency difference between said transmitted and received reflected waves, a transistorized amplifier for said beat frequency signal, solid-state full wave responding and rectifying means coupled to said amplifier to derive a direct current signal positive and negative phases of said amplified beat frquency signal and a transistor trigger circuit controlled by said direct current signal for providing an output change in response to said beat frequncy signal.

2. A detector as in claim 1 and in which said transistor amplifier includes a frequency selective feedback circuit for making the amplifier respond sharply selectively to a low audio band of frequency corresponding to the said Doppler frequency shift as the object passes through said angled beam.

3. A detector as in claim 1 and in which said transistorized amplifier includes circuit means for compensating said amplifier for changes in transistor characteristics over a range of temperature, and in which said compensating circiut means includes a thermistor at least effectively in parallel with said beat frequency signal and a further thermistor at least effecitvely in series with said signal.

4. A detector as in claim 3 in which said amplifier includes successive transistor stages and said thermistors are so connected between two said successive stages.

5. A detector a in claim 1 and said full wave responding and rectifying means including a transistor phase splitting stage for the amplified signal and for providing two outputs of opposite phase relation therefrom and rectifier and filter circuits for the respective two outputs and connected to provide a common resultant direct current output of the same polarity for very brief beat frequency signals representing a relatively positive or relatively negative half wave of the beat frequency signal, whereby said detector will respond to very short partial waves of said beat frequency from object moving through said beam at high speed.

6. A detector as in claim 1 and in which said trigger circuit includes a switching transistor circuit normally biased to one conductive condition in absence of said direct current output and coupled to be controlled by said direct current output to change the bias to switch abruptly to a radically different conductive condition in response to said direct current output from said frequency waves in said amplified frequency band, and an output circuit controlled by said switching transistor circuit.

7. A combination as in claim 6 and including a relay controlled by said output circuit.

8. In a microwave energy comparison device for detecting bodies in motion and for developing an electrical signal varying over a substantial range of frequencies therefrom and for providing an output only in response to a narrow band of low audio frequencies of such signal.

the improvement comprising a transistorized tuned regenerative amplifier having band pass characteristics, said transistorized amplifier including a transistor having a base, emitter and collector and having an input at said base and an output at said collector with respect to a reference connected to the emitter and adapted to receive and amplify said electrical signal and shift the signal between said input and output 180 electrical degrees in phase, a first capacitor connected between a first junction and said output of said transistor to receive part of the output signal of said transistor, a first resistor connected between said first junction and said reference, said first capacitor and said first resistor forming a phase shift network tuned to provide an electrical phase shift of substantially 60 degrees for frequencies within said band pass and a substantially different phase shift for frequencies, outside said band pass, a second capacitor and a second resistor connected together at a second junction, said second capacitor being connected between said first junction and said second junction to form a second phase shift network of characteristics similar to said first phase shift network, a third phase shift network including a third capacitor connected between said second junction and said input and in series with the impedance of the base to emitter circuit of said transistor, said third phase shift network being tuned to provide a phase shift of somewhat less than 60 electrical degrees for signal frequencies within said band pass so that a total electrical phase shift approaching 360 degrees results from the three networks and said transistor and provides regenerative amplification of signals within the particular frequency band of said band pass.

9. A microwave energy comparison device as in claim 8 and in which a resistance is connected between the output of the said transistor and said second junction so that said last named resistor electrically shunts said first and second capacitors in series so that the maximum amplification of the said band pass frequencies may be adjusted as desired.

10. A combination as in claim 9 and further including a variable capacitor connected between the said output of said transistor and said reference so as to adjustably control ringing within the said transistorized tuned regenerative feedback amplifier at the said band pass frequencies.

11. A microwave energy comparison device for detecting moving bodies including, an oscillator for generating constant frequency microwaves, a directive wave radiator and receiver mounted adjacent a pathway and connected to said oscillator for directing a narrow beam of such microwaves from said oscillator so as to intersect angularly with a line formed by the line of travel of the body moving along said pathway and for receiving such microwaves as reflected from a body moving along the pathway through said beam and shifted in frequency in accordance with the Doppler effect with the radial component of such body speed in said beam and for supplying said reflected wave energies to said oscillator, said oscillator serving to mix said generated and reflected waves and to detect the Doppler beat frequency therefrom, a low pass filter to attenuate the high frequency components of the generated and reflected frequencies and to pass the Doppler beat frequency components characteristic of passage of the body through the said beam, a transistorized amplifier for amplifying the output of the said low pass filter, a temperature compensating network including at least one thermistor in series connection with a constant impedance connected between the output of said transistorized amplifier and the ground return and at least one thermistor in parallel connection with a constant impedance with the said parallel connected thermistor and the last mentioned constant impedance connected in series with said output of said transistorized amplifier to increase the amplitude of the output signal passed when the temperature variation causes loss of efficiency in the amplifier stages, a further transistorized amplifier for receiving and amplifying the output of the said temperature compensating network, a transistorized selective feedback amplifier for providing selective amplification of very low frequency components of the Doppler beat frequency signal.

a transistorized phase splitter for providing two outputs of opposite phase from said low frequency amplified components, a plural rectifier and resistor and capacitor network to derive a direct current voltage from the outputs of the phase splitter, a transistorized threshold response amplifier to provide a current output in response to said direct current voltage above a desired value and a relay operated by said current output.

12. In a traffic signal control system, means for continuously generating micro-wave energy at a constant frequency, directive wave radiator means coupled to said generating means for projecting said micro-wave energy in a narrow divergent beam, said wave radiator means mounted adjacent a pathway for so providing said divergent beam as to intersect angularly with the line of travel of a vehicle moving along said pathway, directive wave receiver means for receiving such micro-wave energy as reflected from a vehicle moving along said pathway and through said beam said reflected micro-waves shifted in frequency in accordance with the Doppler effect caused by the motion of the vehicle along said pathway relative to said directive wave radiator and receiver means, means for mixing said generated and reflected micro-wave energies and detecting the Doppler beat frequency therefrom, a low pass filter to attenuate the high frequency components of the detected Doppler beat frequency and to pass only the very low frequencies of said Doppler beat frequency, transistorized means for amplifying said very low frequencies, solid-state temperature compensating means for stabilizing the relation between the amplitude of the said very low frequencies at the input of said transistorized means and the amplitude of said very low frequencies at the output of said transistorized means, said transistorized means also including a selective feedback amplifier circuit with regenerative characteristics for amplifying a low frequency band of said very low frequencies for providing maximum amplification through regenerative feedback of said low frequency band, a transistorized phase splitter for providing two outputs of opposite phase from said low frequency band, solid-state rectifier means to derive a direct current voltage from the outputs of the phase splitter, a transistorized threshold response amplifier to provide a current output in response to said direct current voltage above a desired value, means responsive to said current output for providing a pulse output indicative of passage of a vehicle through said beam and means coupled to said responsive means to be controlled by said pulse output for controlling a traffic signal.

13. A system for counting objects moving along a path and passing a point adjacent said path and including transmitter-receiver means for mounting adjacent said point for transmitting and receiving a beam of high frequency waves transverse to said path and means for deriving low frequency waves from modulation of said transmitted waves caused by passage of an object through said beam, a temperature compensated transistorized frequency selective amplifier for receiving and amplifying a narrow frequency band of said low frequency waves, full wave responding and rectifying means including a transistor phase splitting stage and solid-state diodes for deriving a direct current output from low frequency waves in said amplified band, a switching transistor circuit normally biased to one conductive condition in absence of said direct current output from said amplified low frequency waves and coupled to be controlled by said direct current output to change the bias to switch to a radically different conductive condition in response to said direct current output from said amplified low frequency waves, and a counter controlled by the conductive condition of said switching circuit to be operated in response thereto as an object passes through said beam.

14. A detector of objects moving along a path including means for transmitting a beam of high frequency waves at an angle across said path to be intercepted by said objects and for receiving such waves reflected from said objects and Doppler shifted in frequency by the component in the direction of said transmitter-receiver of the motion of said object along said path, means for deriving a beat frequency signal representative of the frequency difference between said transmitted and received reflective waves, a transistor amplifier for said beat frequency signal, rectifying means coupled to said amplifier to derive a direct current signal from said amplified beat frequency signal, and a transistor trigger circuit controlled by said direct current signal for providing an output change in response to said beat frequency signal, said transistor trigger circuit including
    a transistor,
    means for normally biasing the last named transistor for one conductive condition in absence of said direct current output derived from said amplified low frequency,
    means for changing said bias to abruptly change said last named transistor to a radically different second conductive condition in response to said direct current output derived from said amplified low frequency, and circuit means coupling said transmitter means to said trigger circuit for deriving an electrical signal from said transmitter means related to its transmission of high frequency waves for so changing the bias of said last named transistor in response to a change in said electrical signal corresponding to a reduction in transmitted waves below an amplitude sufficient for reliable detection of moving objects.

15. A device for detecting bodies moving along a pathway, said device including means mounted over said pathway for transmitting a narrow beam of microwave energy downward onto the pathway at a slight angle from the vertical in line with the direction of movement of said body along said pathway and for receiving back microwave energy reflected from a moving body in said beam and shifted in frequency by the Doppler effect of the component of the speed of said body toward the transmitting and receiving means caused by movement of the body along said pathway through such angled beam and for mixing said transmitted and reflected microwave energies and deriving the Doppler beat frequency therefrom, transistor amplifier means for amplifying said beat frequency, means for filtering said beat frequency to derive a very low frequency component therefrom characteristic of passage of such body through said angled beam, transistor selective feedback amplifier means for selectively amplifying the very low frequency component, means for compensating for variations in characteristics of said transistor amplifier means due to change in temperature, said compensating means including two thermistors and two resistors, with one of said thermistors and one of said resistors connected in series across the output of one transistor amplifier means and the other thermistor and resistor being connected in parallel between the last mentioned output of said amplifying means and the input to another stage of amplification for said very low frequency component, and said device including solid-state means for controlling an output circuit in response to said low frequency amplified component.

References Cited by the Examiner

UNITED STATES PATENTS 2,965,893  12/60  Barker _____ 343—8

CHESTER L. JUSTUS, *Primary Examiner*.